(12) United States Patent
Inoue

(10) Patent No.: US 11,188,277 B2
(45) Date of Patent: Nov. 30, 2021

(54) PRINTING APPARATUS THAT SUPPORTS A TENANT OF CLOUD COMPUTING

(71) Applicant: CANON KABUSHIKI KAISHA, Tokyo (JP)

(72) Inventor: Go Inoue, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/788,191

(22) Filed: Feb. 11, 2020

(65) Prior Publication Data

US 2020/0257478 A1 Aug. 13, 2020

(30) Foreign Application Priority Data

Feb. 13, 2019 (JP) .............................. JP2019-023922

(51) Int. Cl.
*G06F 3/12* (2006.01)
(52) U.S. Cl.
CPC .......... *G06F 3/1222* (2013.01); *G06F 3/1239* (2013.01); *G06F 3/1288* (2013.01)
(58) Field of Classification Search
None
See application file for complete search history.

(56) References Cited

U.S. PATENT DOCUMENTS

| 2006/0146360 A1* | 7/2006 | Simonds ................. G06F 3/122 358/1.15 |
| 2007/0229886 A1* | 10/2007 | Sakurai ................. G06Q 10/10 358/1.15 |
| 2007/0273923 A1* | 11/2007 | Kimura ................... G06F 3/122 358/1.15 |
| 2012/0155643 A1* | 6/2012 | Hassan ............... H04L 67/1093 380/270 |
| 2014/0211247 A1* | 7/2014 | Matsuda ............... G06F 3/1288 358/1.15 |
| 2015/0363139 A1* | 12/2015 | Ishihara ................ G06F 3/1287 358/1.14 |

FOREIGN PATENT DOCUMENTS

JP 2017-170895 A 9/2017

* cited by examiner

*Primary Examiner* — Eric A. Rust
(74) *Attorney, Agent, or Firm* — Canon U.S.A., Inc. IP Division

(57) ABSTRACT

Tenant information in which a printing apparatus is registered and tenant information of a user that is included in a print job are compared in the printing apparatus, and a user of another tenant is controlled not to freely use the printing apparatus, by providing an appropriate printing permission control method for a job of another tenant.

10 Claims, 17 Drawing Sheets

FIG.4

TENANT 102 TERMINAL ADMINISTRATION SCREEN

- TERMINAL LIST
  - PRINTING APPARATUS

| NAME | STATE | ID | INSTALLATION LOCATION |
    |---|---|---|---|
    | iR-ADV 5500 | idle | xxxx1234 | 1F-a |
    | LBP650 | off | abcd7654 | 2F-c |

- FILE SERVER

| NAME | STATE | ID | INSTALLATION LOCATION |
    |---|---|---|---|
    | backupsrv | on | 5739ac3d | 3F-a |
    | docsharesrc | on | xde2e32e | 4F-c |

[ ADD NEW TERMINAL ]   [ EDIT ]   [ DELETE ]

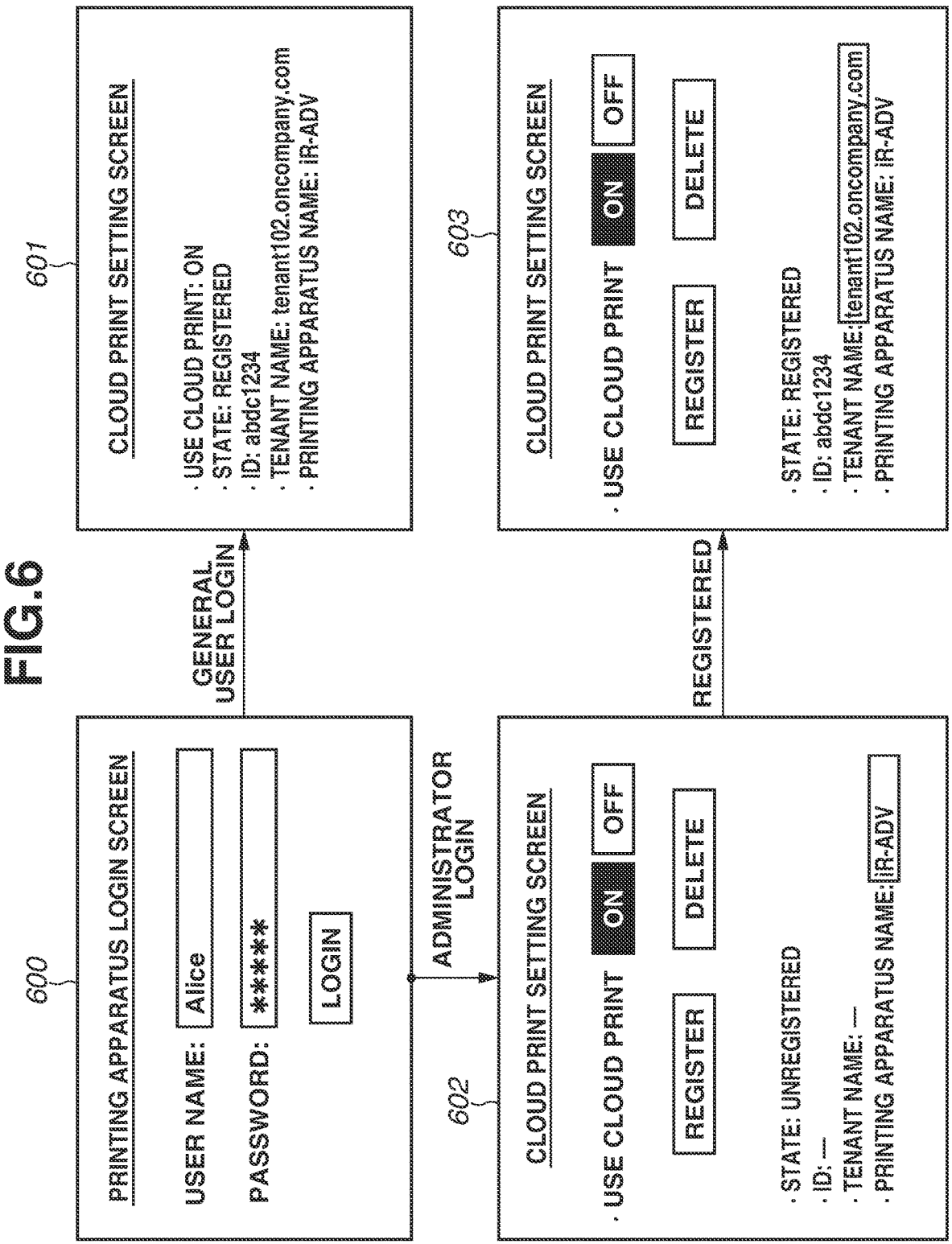

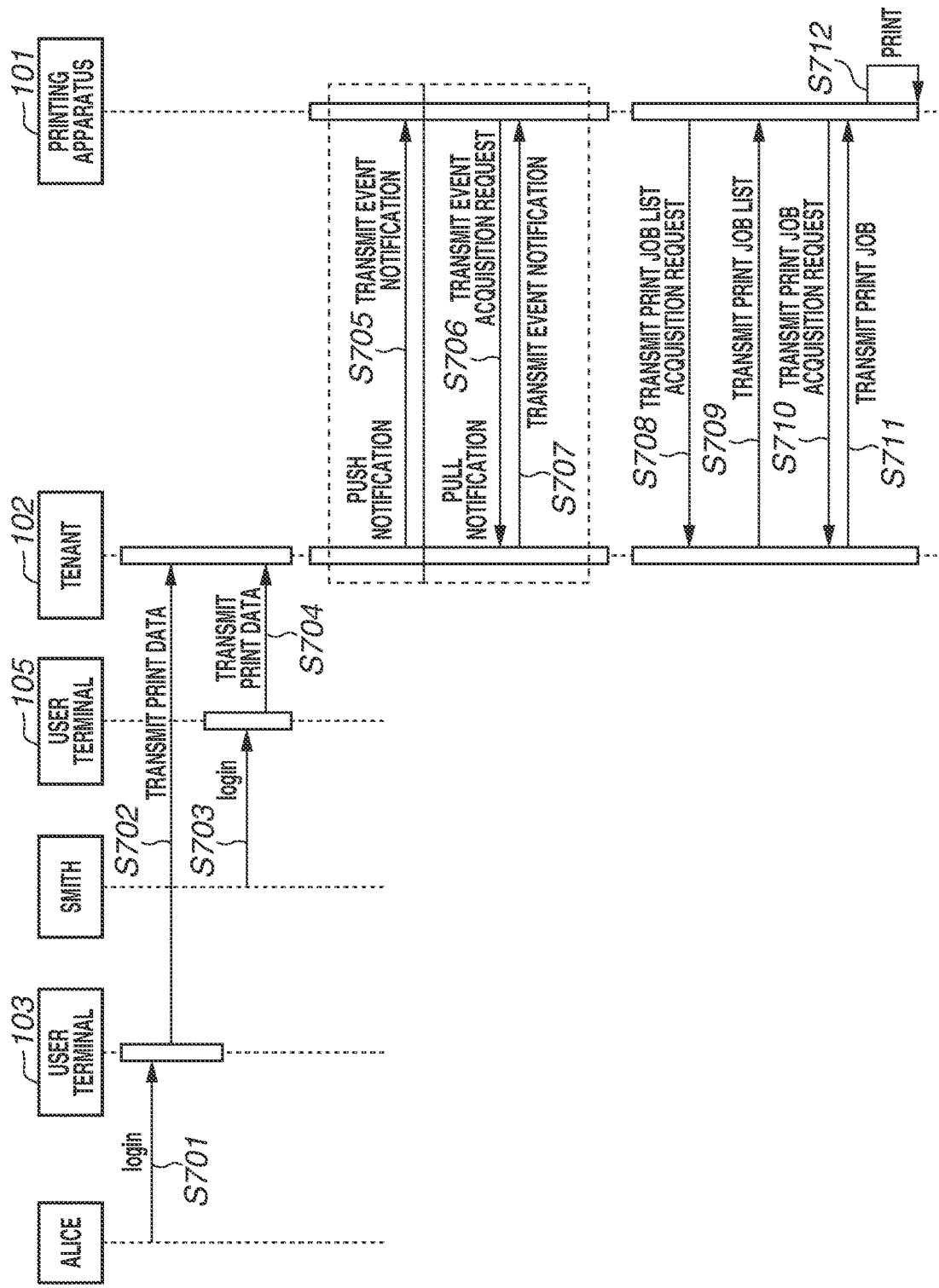

FIG.8

801 — Get-Jobs Request

Internet Printing Protocol
-version: 2.0
-operation-id: Get-Jobs
-request-id: 100
-operation-attribute-tag
-attributes-charset: utf-8
-attributes-natural-language: en
-printer-uri: https://tenant102.oncompany.com/xxxx1234
-requested-attributes: job-id,job-name,requesting-user-uri
-my-jobs: false

802 — Get-Jobs Response

Internet Printing Protocol
-version: 2.0
-status-code: successful
-request-id: 100
-job-attributes-tag
-job-id: 201
-job-name: job1
-requesting-user-uri: alice@tenant102.oncompany.com
-job-attributes-tag
-job-id: 202
-job-name: job2
-requesting-user-uri: smith@tenant104.oncompany.com

803 — Fetch-Job Request

Internet Printing Protocol
-version: 2.0
-operation-id: Fetch-Job
-request-id: 101
-operation-attribute-tag
-attributes-charset: utf-8
-attributes-natural-language: en
-job-id: 202

804 — Fetch-Job Response

Internet Printing Protocol
-version: 2.0
-status-code: successful
-request-id: 101
-job-attributes-tag
-job-id: 202
-job-name: job2
-job-originating-user-name: smith
-requesting-user-name: smith
-requesting-user-uri: smith@tenant104.oncompany.com
-contents data
 xxxyyyzzz......,

FIG.12

| JOB HISTORY | | | |
|---|---|---|---|
| TIME | JOB NAME | JOB OWNER NAME | RESULT |
| 12/20 17:15 | Job1 | ALICE | OK |
| 12/21 18:20 | Job2 | SMITH | NG (TENANT ACCESS RIGHT ERROR) |

FIG. 16

1601 — Get-Jobs Request

Internet Printing Protocol
-version: 2.0
-operation-id: Get-Jobs
-request-id: 100
-operation-attribute-tag
-attributes-charset: utf-8
-attributes-natural-language: en
-printer-uri: https://tenant102.oncompany.com/xxxx1234
-requested-attributes: job-id,job-name,requesting-user-uri
-my-jobs: true
-requesting-user-uri: smith@tenant104.oncompany.com

1602 — Get-Jobs Response

Internet Printing Protocol
-version: 2.0
-status-code: successful
-request-id: 100
-job-attributes-tag
-job-id: 401
-job-name: job1
-requesting-user-uri: smith@tenant104.oncompany.com
-job-attributes-tag
-job-id: 402
-job-name: job-color
-requesting-user-uri: smith@tenant104.oncompany.com

1603 — Fetch-Job Request

Internet Printing Protocol
-version: 2.0
-operation-id: Fetch-Job
-request-id: 101
-operation-attribute-tag
-attributes-charset: utf-8
-attributes-natural-language: en
-job-id: 401

1604 — Fetch-Job Response

Internet Printing Protocol
-version: 2.0
-status-code: successful
-request-id: 101
-job-attributes-tag
-job-id: 491
-job-name: job1
-job-originating-user-name: smith
-requesting-user-name: smith
-requesting-user-uri: smith@tenant104.oncompany.com

US 11,188,277 B2

PRINTING APPARATUS THAT SUPPORTS A TENANT OF CLOUD COMPUTING

BACKGROUND

Field of the Disclosure

The present disclosure relates to a printing apparatus that supports a tenant of cloud computing (cloud), a control method therefor, and a storage medium.

Description of the Related Art

Cloud print services have been made available. In the cloud print services, a printing apparatus is registered in a print service provided by a server on the Internet, the printing apparatus receives a print job output in accordance with an instruction from a client via a cloud service, and performs printing. To cooperate with the cloud print service, the printing apparatus needs to have a structure for cooperating with the cloud print service.

As an example of a printing system having such a network configuration, a configuration called IPP-Infra that uses an Internet Printing Protocol (IPP) as a printing protocol is proposed in the PWG5100.18.

When the printing apparatus is registered in the cloud print services, an administrator of the printing apparatus registers a tenant of a cloud via the printing apparatus. The printing apparatus is registered in the tenant of the cloud to which the administrator belongs, and the printer becomes searchable/usable by any user who belongs to the same tenant. The tenant refers to an individual unit in which a cloud service is provided.

When a user uses this tenant, the user logs into the tenant via a terminal device of the user. After that, printing apparatuses registered in the tenant become referable. The user transmits a print job to a desired printing apparatus, and the print job is temporarily saved in the tenant of the cloud. The printing apparatus then acquires the job from the tenant and performs printing (refer to Japanese Patent Application Laid-Open No. 2017-170895).

SUMMARY

According to an aspect of the present disclosure, a printer that communicates with a print service that executes multi-tenant management by registering a user and a printer for each tenant, and in a case where a printer belonging to a first tenant is instructed to be shared by a user belonging to a second tenant, provides a print job to the printer belonging to the first tenant, in accordance with a printing instruction of the user belonging to the second tenant, includes a registration unit configured to start processing of registering the printer in the first tenant in accordance with a registration instruction from an owner of the printer, and a setting unit configured to receive, from the owner, a setting for determining a tenant that is allowed to use the printer registered in the first tenant, wherein, after the tenant that is allowed to use the printer is determined based on the received setting, a print job of a user belonging to the tenant that is allowed to use the printer is processed without processing a print job of a user belonging to a tenant that is not allowed to use the printer.

Further features of the present disclosure will become apparent from the following description of exemplary embodiments with reference to the attached drawings.

BRIEF DESCRIPTION OF THE DRAWINGS

FIG. 4 is a diagram illustrating a terminal administration setting screen of a tenant.

FIG. 6 is a diagram illustrating cloud setting screens of a printing apparatus according to one or more aspects of the present disclosure.

FIG. 7 is a sequence diagram illustrating cloud print.

FIG. 8 illustrates packet data about cloud print.

FIG. 12 illustrates a job history of cloud print according to one or more aspects of the present disclosure.

FIG. 16 illustrates packet data about cloud print according to one or more aspects of the present disclosure.

DESCRIPTION OF THE EMBODIMENTS

Multi-tenancy is sometimes employed rather than a single-tenancy depending on client environments. In such a case, access restrictions are imposed on between tenants, and general users are basically unauthorized to access resources of other tenants. Nevertheless, the users become accessible to resources of other tenants by a tenant administrator performing an access right setting.

On the other hand, an administrator of a printing apparatus does not want users of other tenants to use the printing apparatus in some cases. Examples of such cases include a case where print counting or the upper limit number of printable sheets are managed only for users of the own tenant. If a tenant administrator makes an access right setting regardless of the intention of a printing apparatus administrator of each tenant, a printing apparatus, which is one of tenant resources, is freely used by users of other tenants and the intention of an administrator of the printing apparatus is not reflected.

The present disclosure is directed to providing a printing apparatus that solves the above-described issue, and also to implementing appropriate printing access control by causing a tenant to which the printing apparatus belongs to control printing of a print job from a user of another tenant.

Hereinafter, exemplary embodiments of the present disclosure will be described with reference to the drawings.

Figure 1:
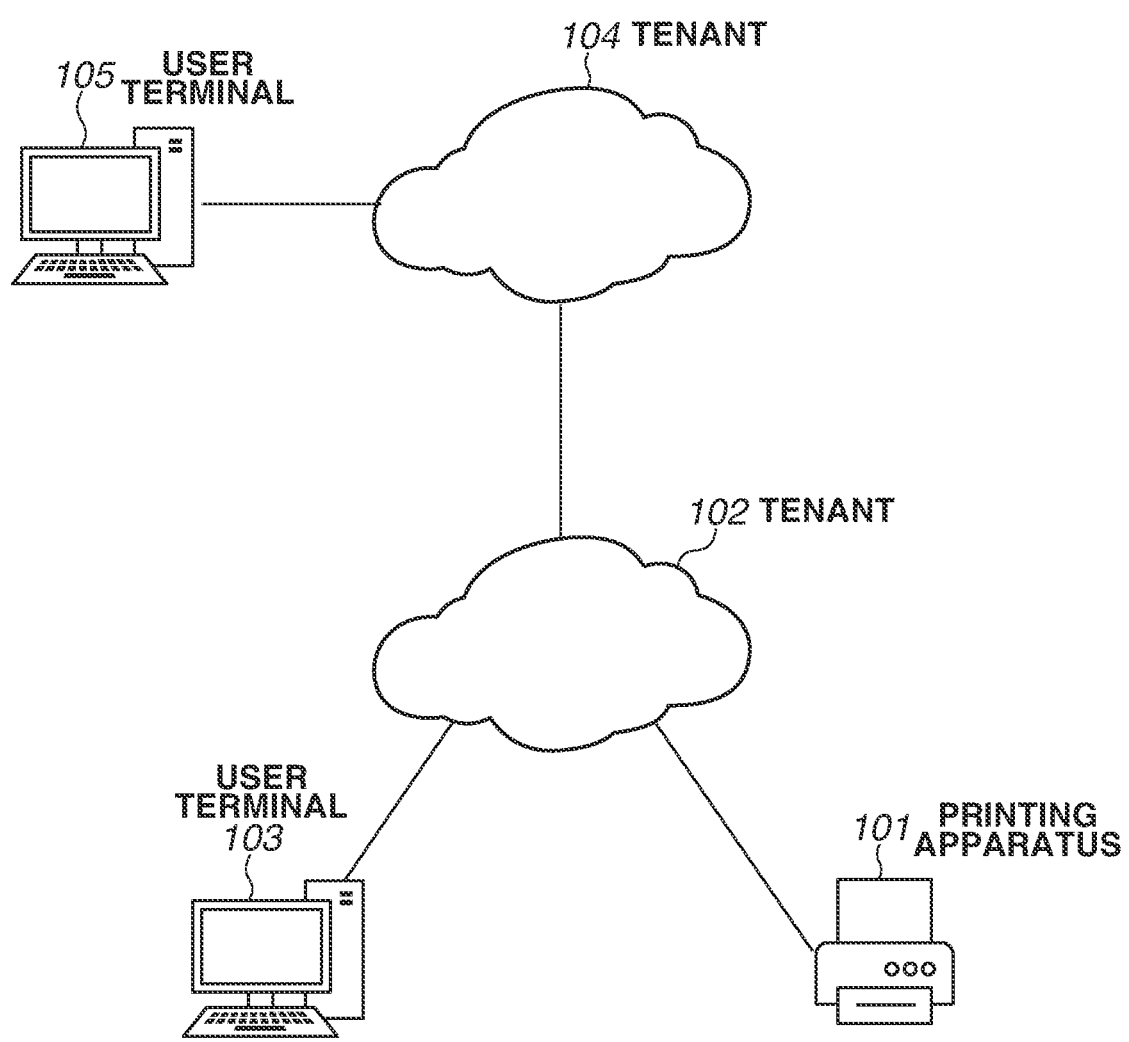
FIG. 1 is a diagram illustrating a system configuration according to one or more aspects of the present disclosure.

A first exemplary embodiment of the present disclosure will be described below. FIG. 1 is a configuration diagram illustrating a print system including a printing apparatus to which the present disclosure has been applied. A printing apparatus 101 is a printing apparatus to which the present disclosure has been applied, and is a printer. Tenants 102 and 104 provide a print service to be provided on the Internet. FIG. 1 illustrates an example in which each of the tenants exists in one server system, but two tenants may exist in one server system. The print system according to the present exemplary embodiment implements multi-tenant management by registering a user, a printer, and other types of information for each tenant. As basic idea of the multi-tenant management, a user belonging to a certain tenant cannot access information managed by another tenant. This is a principle of a structure called cloud computing (cloud), but the principle is not applied to a case where resource sharing to be described below is performed.

User terminals 103 and 105 are operation terminals of users. The printing apparatus 101 is preregistered in the tenant 102 by an administrator (hereinafter, will be referred to as an owner) of the printing apparatus. The user selects the printing apparatus 101 registered in the tenant 102, from the user terminal 103, and transmits print data to the tenant 102. The printing apparatus 101 receives, via the tenant 102, the print data transmitted by the user, and performs printing. The terminal of the user is not limited to the user terminal 103, and the user can use the tenant 102 from a plurality of user terminals, such as a general-purpose personal computer and a smartphone, which are not illustrated in the drawing.

The printing apparatus 101 and the user terminal 103 are connected with the tenant 102 via the Internet. When a tenant administrator causes the tenants 102 and 104 to cooperate with each other, and makes the setting of sharing their resources, it becomes possible for the user to use the printing apparatus 101 from the user terminal 105. The resource sharing refers to enabling a user who can originally access only resources of the tenant 104, to access resources of the tenant 102, for example.

<Hardware Configuration of Printing Apparatus>

Figure 2:
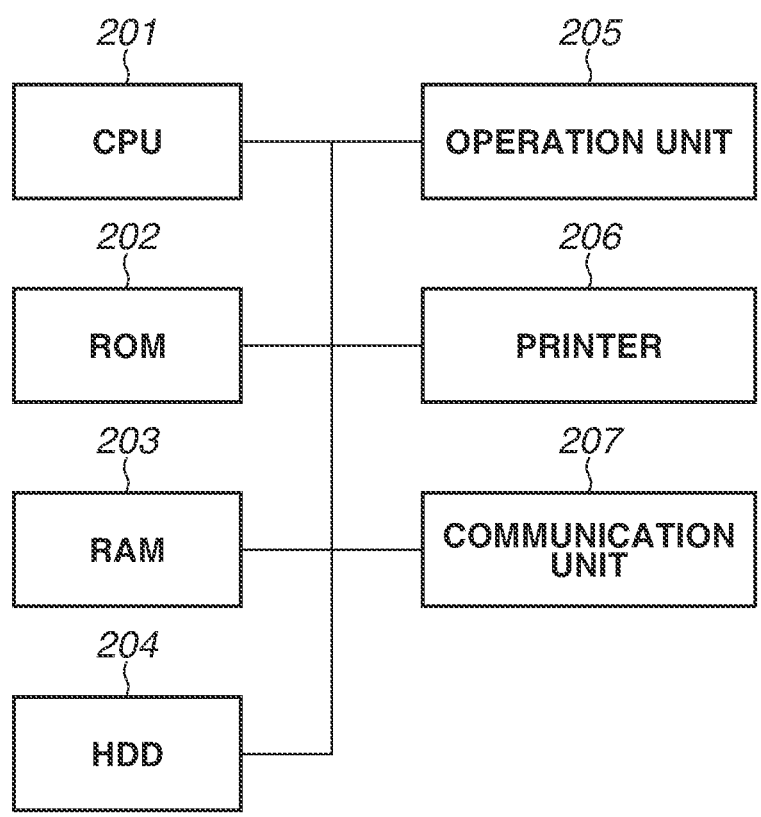
FIG. 2 is a block diagram illustrating a hardware configuration of a printing apparatus.

FIG. 2 is a schematic block diagram illustrating a hardware configuration of the printing apparatus 101. A central processing unit (CPU) 201 controls operations of the entire printing apparatus 101 (multifunction peripheral). A random access memory (RAM) 203 is a volatile memory, and is used as a work area or a temporary storage area for loading various control programs stored in a read-only memory (ROM) 202 and/or a hard disk drive (HDD) 204.

The ROM 202 is a nonvolatile memory and stores a boot program of the printing apparatus 101. The HDD 204 is a nonvolatile hard disc having larger capacity than the RAM 203. The HDD 204 stores a control program for the printing apparatus 101. An operating system (OS) and an application program are also stored in the HDD 204.

The CPU 201 executes the boot program stored in the ROM 202 when activating the printing apparatus 101. The boot program is used for reading out a program of the OS stored in the HDD 204, and loading the program onto the RAM 203. When the CPU 201 executes the boot program, the CPU 201 subsequently executes the program of the OS that has been loaded onto the RAM 203, thus controlling the printing apparatus 101. The CPU 201 also stores data to be used for performing an operation in accordance with a control program, into the RAM 203, and performs reading and writing of the data.

In the printing apparatus 101, a single CPU 201 executes each process illustrated in a flowchart (described below), but other configurations may be employed. For example, a plurality of CPUs or microprocessor units (MPUs) can cooperatively execute each process illustrated in a flowchart (described below). A part of processing to be described below may be executed using a hardware circuit, such as an application specific integrated circuit (ASIC) or a field-programmable gate array (FPGA).

An operation unit 205 is a touch-operable display. A printer 206 is a printer engine that prints print data received from the outside via a communication unit 207. The communication unit 207 is a network interface for connecting to the Internet or a local area network (LAN) of an office. The user terminal 103 and the tenants 102 and 104 each include hardware configurations similar to the CPU 201, the ROM 202, the RAM 203, and the HDD 204. Each software function of each device described in the following description and processing which is executed by the software function are implemented by the CPU 201 loading a program saved in the ROM 202, onto the RAM 203, and executing the program.

<Software Configuration>

Figure 3:
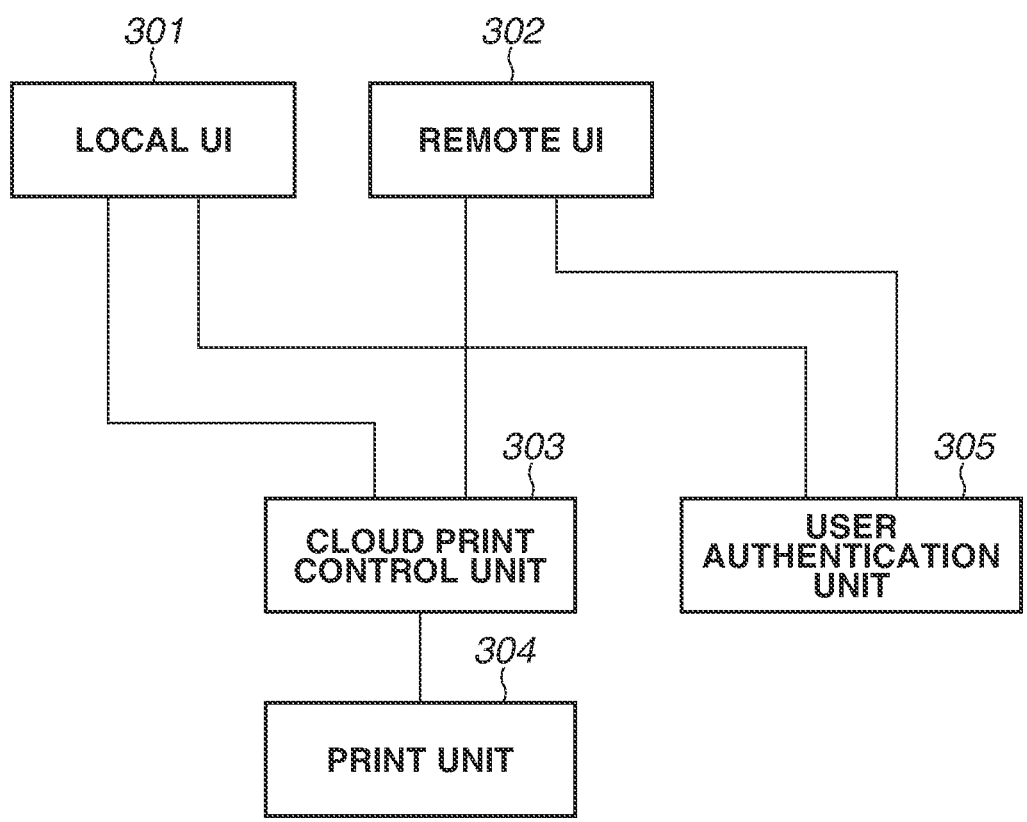
FIG. 3 is a block diagram illustrating a software configuration of the printing apparatus.

FIG. 3 is a schematic block diagram illustrating a software configuration of the printing apparatus 101, and illustrates a software configuration to be implemented by the CPU 201 loading a program stored in the ROM 202, onto the RAM 203, and executing the program. A local user interface (UI) 301 provides a user interface for the user to change the setting or use functions of the printing apparatus, using a display of the operation unit 205. A remote UI 302 provides, to the user, a user interface having a Hypertext Transfer Protocol (HTTP) server function and being described in a HyperText Markup Language (HTML).

The user terminal 103 includes a web browser (not illustrated) that transmits an HTML request and displays a screen based on HTML-format data received as a response. The user can access the remote UI 302 using the web browser of the user terminal 103, and change the setting or use the functions of the printing apparatus. A cloud print control unit 303 is a software module implementing a communication protocol and a function for handling the tenant 102. A print unit 304 receives print data received by the cloud print control unit 303 from the tenant 102, and controls the printer 206 to execute print processing.

A user authentication unit 305 is a software module that authenticates a user who uses the local UI 301 or the remote UI 302. Accounts of an administrator and a general user can be registered in the HDD 204 via the user interface of the local UT 301 or the remote UT 302. As account information, a user name, a password, a role (administrator/general user), and an e-mail address can be registered in the HDD 204. The user authentication unit 305 acquires a user name and a password from a login screen displayed on the local UI 301 or the remote UI 302, and compares the acquired user name and password with the account information registered in the HDD 204, thus performing user authentication.

If the authentication has succeeded, the user who has succeeded in the authentication is caused to log into the printing apparatus 101. Specifically, the user authentication unit 305 instructs the local UI 301 or the remote UI 302 to close the login screen and transition to a menu screen. Information (user name, role, e-mail address) regarding the login user is conveyed to a software module, such as the cloud print control unit 303.

The tenant 102 has a function of registering printing apparatuses 101, and a function of converting print data designated from the user terminal 103 to be printed, into a print job, and providing the print job to a printing apparatus 101 selected from among a plurality of registered printing apparatuses 101. These functions are provided by a software configuration, and the software configuration is implemented by the CPU 201 loading a program stored in the ROM 202, onto the RAM 203, and executing the program.

<Tenant Administration Setting>

Figure 5:
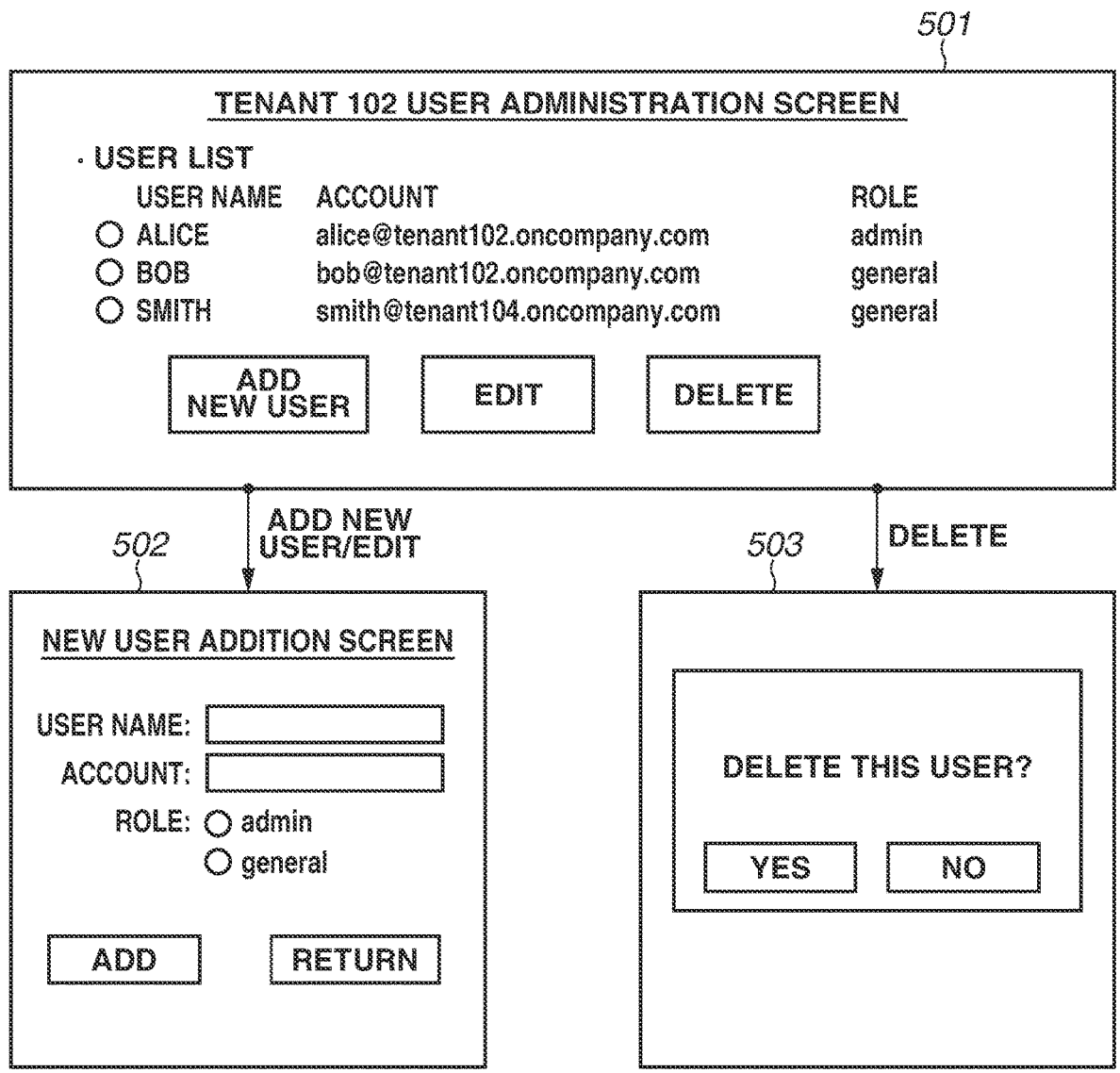
FIG. 5 is a diagram illustrating user administration setting screens of the tenant.

Tenant administrators of the tenants 102 and 104 manage terminals and users of the respective tenants via administration setting screens as illustrated in FIGS. 4 and 5 that are provided with an optional tenant function. That is to say, a terminal and a user are managed for each tenant. As described above, a configuration of implementing a plurality of tenants in one server system, and then providing functions to the plurality of tenants by a Web application of the one server system can be considered.

FIG. 4 illustrates a terminal administration setting screen provided by the tenant 102. Names, states, installation locations, and management numbers of printing apparatuses and file servers are made settable and referable. In a case where a new terminal is registered in a tenant, registration processing may be performed from each terminal to the tenant, or a tenant administrator may virtually add a new terminal from this screen, and then associate the added terminal with an actual terminal. FIG. 4 illustrates a case where two printing apparatuses and two file servers exist in the tenant 102.

FIG. 5 illustrates an example of a user administration setting screen of the tenant 102. A tenant administrator can newly add, edit, or delete a user from this screen. FIG. 5 illustrates a case where one user having an administrative right and two users having a general right are registered. The users registered on this setting screen can basically use the apparatuses in the terminal list of the tenant 102 that are illustrated in FIG. 4. In this setting, while Alice and Bob belong to the same account domain, the tenant 102, Smith belongs to an account domain in the tenant 104. In this case, a tenant administrator of the tenant 102 and/or the tenant 104 makes a resource sharing setting by instructing the tenants 102 and 104 to share resources via a screen (not illustrated). After that, it becomes possible for a user authorized to access the tenant 102, such as Smith belonging to the tenant 104, to use the apparatuses of the tenant 102 from the user terminal 105.

In addition, a user ID (user name) and a tenant account name of a login user in the printing apparatus 101 are associated with each other as illustrated in FIG. 5, and a plurality of tenant account names can be associated with one user ID or a plurality of user IDs can be associated with one tenant account name.

<Cloud Print Processing>

FIGS. 6, 7, and 8 illustrate examples of a basic setting screen, a sequence, and network packet data for cloud print processing, respectively. FIG. 6 illustrates a setting screen relating to cloud print of the printing apparatus 101. On a screen 600, an administrative user having an administrative right of the printing apparatus 101 logs into the printing apparatus 101 from the local UI 301, and a cloud print setting screen illustrated as a screen 602 is displayed. If the user performs a registration instruction by pressing a registration button, the printing apparatus 101 starts processing of registering the printing apparatus 101 in the tenant 102. A registration state of a printer is also displayed on the setting screen, necessity/unnecessity of a tenant setting can be easily recognized.

If the registration processing has succeeded, the state shifts to a registered state as illustrated in a screen 603, and a management number and the name of the registered tenant are displayed. In the registration processing, a device name, identification information, and installation location information about the printing apparatus 101 are transmitted to the tenant. A uniform resource locator (URL) of the registration destination tenant 102 may be preinstalled in the printing apparatus, or may be set by an administrator on the setting screen. For example, identification information of the tenant 102 may be input on the screen 600, or the identification information may be input on another screen different from the screen 600.

If name information about a registered tenant can be acquired from the tenant 102 during the registration processing, the acquired name information is used as a tenant name. If the name information cannot be acquired, the printing apparatus 101 may acquire a tenant name by inquiring of the tenant 102 about a tenant name after the completion of registration, or the administrator may set a tenant name in the printing apparatus. If a general user logs into the printing apparatus on the screen 600, a reference-only screen is displayed as illustrated in a screen 601.

FIG. 7 is a sequence diagram illustrating an example of a sequence for executing printing after tenant registration processing of the printing apparatus 101 has been completed. When user Alice belonging to the tenant 102 prints image data saved in the user terminal 103, in step S701, Alice initially logs into the user terminal 103 and searches for a printing apparatus belonging to the same tenant. If Alice finds the printing apparatus 101 and issues a printing instruction, in step S702, Alice transmits a print job to the printing apparatus 101 from the user terminal 103. The print job is temporarily saved into the tenant 102. In a similar manner, in step S703, user Smith belonging to the tenant 104 can log into the user terminal 105 and search for the printing apparatus 101 with which resources are shared, and in step S704, transmit a print job to the printing apparatus 101 from the user terminal 105.

As a method by which the printing apparatus 101 detects a print job saved in the tenant 102, two types of methods exist. The first method is a method of transmitting a PUSH notification from the tenant 102 to the printing apparatus 101. If a print job is input, in step S705, the tenant 102 identifies a printing apparatus to which the job is addressed, and transmits a PUSH notification to the printing apparatus. A tenant and a printing apparatus need to be almost always in a connected state to implement PUSH notification, and thus, a technique such as WebSocket, Server-Sent Event, or long polling may be used. The structure of Internet Printing Protocol (IPP) Event Notification defined in RFC3995 may also be used as an event notification method.

The second method is a method through which the printing apparatus 101 checks whether an event exists, by periodically performing polling to the tenant 102 in step S706. A polling interval may be an optional interval, such as a one-minute interval, and a polling interval designated by a tenant may be employed or a polling interval may be made settable by a printing apparatus. In step S707, if no event exists, the tenant 102 transmits a response indicating that no event exists, and if an event exists, the tenant 102 transmits a notification indicating that an event exists. In step S708, the printing apparatus 101 that has determined through the above-described detection method that an event of a print job exists transmits an acquisition request for a print job list to the tenant 102. Packet data 801 in FIG. 8 illustrates an example of data transmitted at this time.

In the first exemplary embodiment, a print job list acquisition request is made using the IPP. While an optional attribute can be designated using the IPP, "My-Jobs" is designated to "False" in this example. In such a case, a print job specific to a specific user is not requested but print jobs of all users are requested. In response to the request, in step S709, the tenant 102 transmits a response to the printing apparatus 101. Packet data 802 in FIG. 8 illustrates an example of a response packet. FIG. 8 illustrates an example in which a print job input by Alice and a print job input by Smith exist. Each job includes a job name, a job management number, and an account name of the user who has input the corresponding job. Aside from information items listed in this example, detailed printing settings of the job and user information may be included.

If a print job list is acquired, in step S710, the printing apparatus 101 designates a specific one job and makes a print job acquisition request. Packet data 803 in FIG. 8 illustrates an example of a request packet transmitted at this time. The packet data 803 illustrates an example in which a job of Smith is acquired. In the first exemplary embodiment, only a job management number of the job of Smith is designated, but the packet data may include a job name and user information aside from the job management number. The type of information to be included in a request to be transmitted may be made settable on the setting screen of the printing apparatus 101. If the tenant 102 receives the print job acquisition request, in step S711, the tenant 102 transmits corresponding print job data to the printing apparatus 101. Packet data 804 in FIG. 8 illustrates an example of a response packet transmitted at this time. The packet data 804 may include attributes, such as a job name and a job owner name in addition to content of print job data. In step S712, the printing apparatus 101 performs printing.

<Access Control of Cloud Print Processing>

FIGS. 9, 10, 11, and 12 respectively illustrate examples of a setting screen, a sequence diagram, a flowchart, and a job history related to cloud print processing which is performed when access control between tenants is executed. As described above, it becomes possible in a multi-tenant environment for the user to access resources of other tenants by a tenant administrator performing an access right setting.

On the other hand, an administrator of a printing apparatus does not want users of other tenants to use the printing apparatus in some cases. Examples of such cases include a case where print counting and/or the upper limit number of printable sheets are managed only for users of the own tenant. In such a case, if a tenant administrator makes an access right setting regardless of the intention of a printing apparatus administrator of each tenant, a printing apparatus as one of tenant resources is freely used by users of other tenants, which is an issue to be solved.

Figure 9:
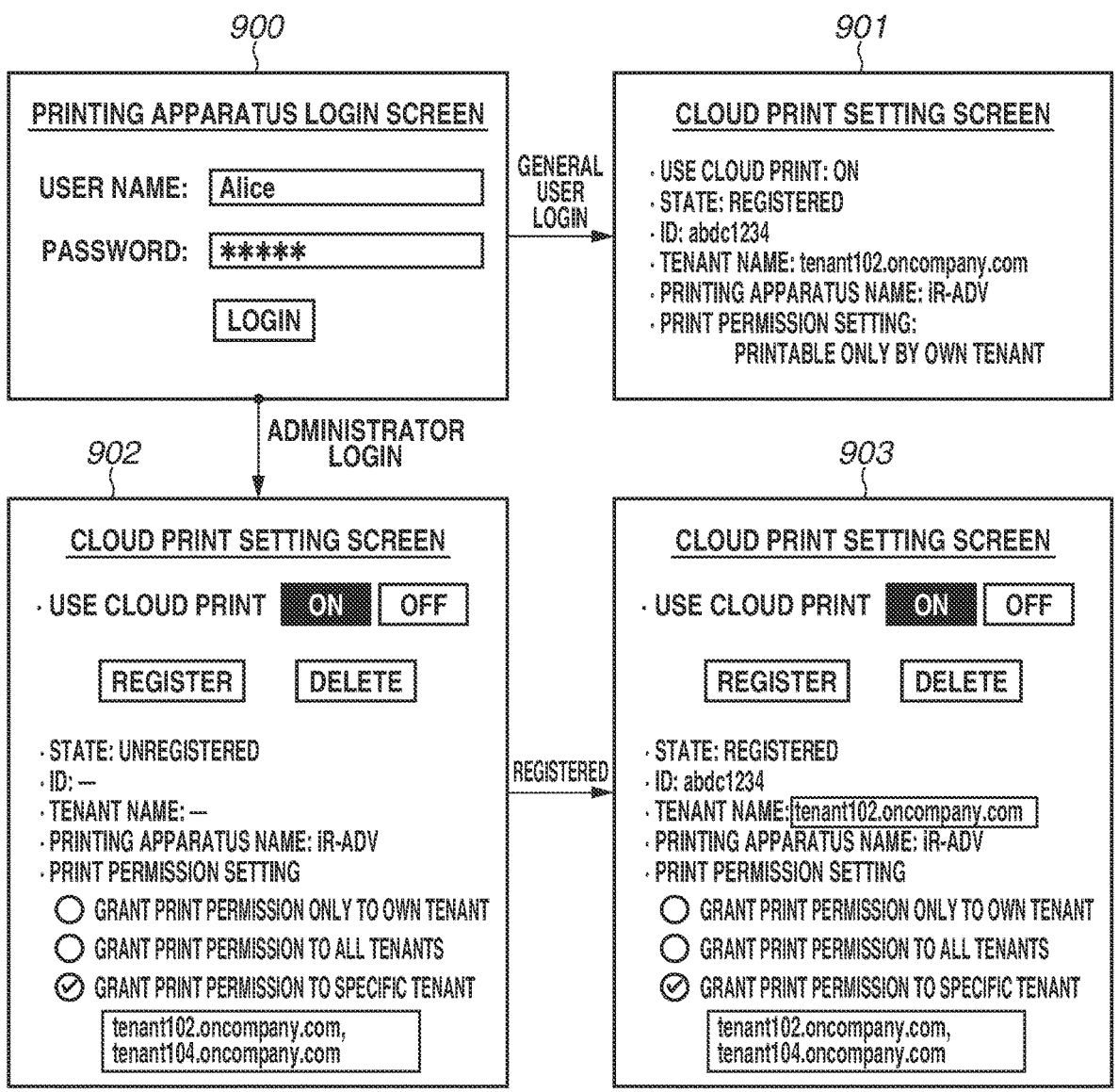
FIG. 9 is a diagram illustrating cloud setting screens of a printing apparatus according to one or more aspects of the present disclosure.

FIG. 9 illustrates an example of a screen for making an access control setting for tenants in the printing apparatus 101 to address the above-described issue. FIG. 9 illustrates an example of a screen including a printing permission setting for a tenant in addition to the basic settings related to cloud print illustrated in FIG. 6. The printing permission setting includes options including "grant a print permission only to an own tenant", "grant a print permission to all tenants", and "grant a print permission to a specific tenant", for example, and a printing apparatus administrator selects any one of these options. If the printing apparatus administrator selects "grant a print permission to a specific tenant", an optional tenant name can be set. The "own tenant" means a tenant in which the printing apparatus 101 is registered when the registration of the printing apparatus 101 has been completed. By the user performing the selection, a tenant that can use the printing apparatus 101 is determined.

FIG. 9 illustrates a setting screen for setting a tenant that can perform printing with the printing apparatus 101, but the configuration is not limited to this. For example, a tenant unauthorized to perform printing with the printing apparatus 101 may be received, or a tenant name or tenant identification information may be directly input from the user instead of selecting a tenant from the three options as illustrated in FIG. 9. For example, if a setting method of receiving a tenant unauthorized to perform printing with the printing apparatus 101 is employed, examples of options include "a print permission is not granted to tenants other than the own tenant", and "not provide tenants unauthorized to perform printing".

Figure 10:
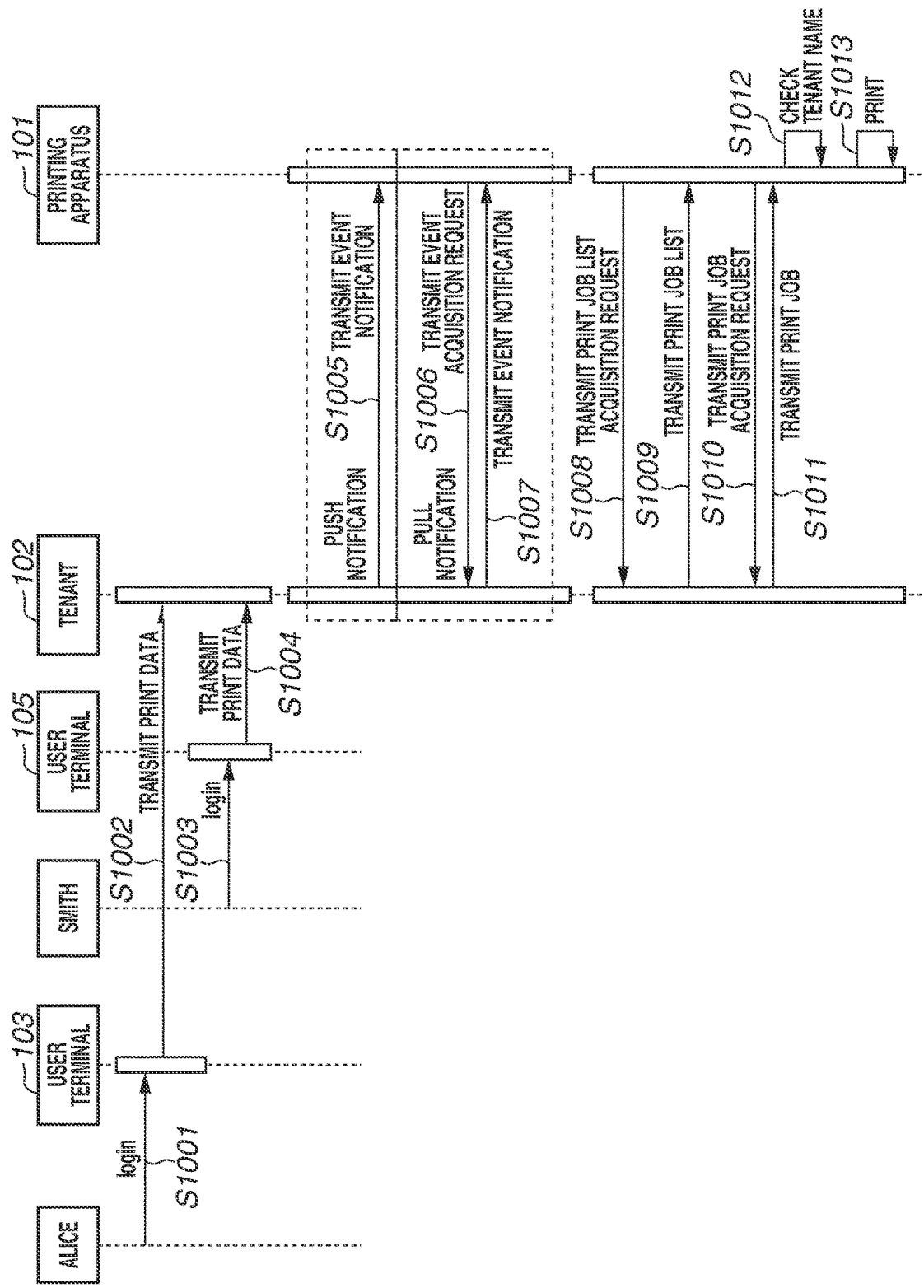
FIG. 10 is a sequence diagram illustrating cloud print according to one or more aspects of the present disclosure.
Figure 11:
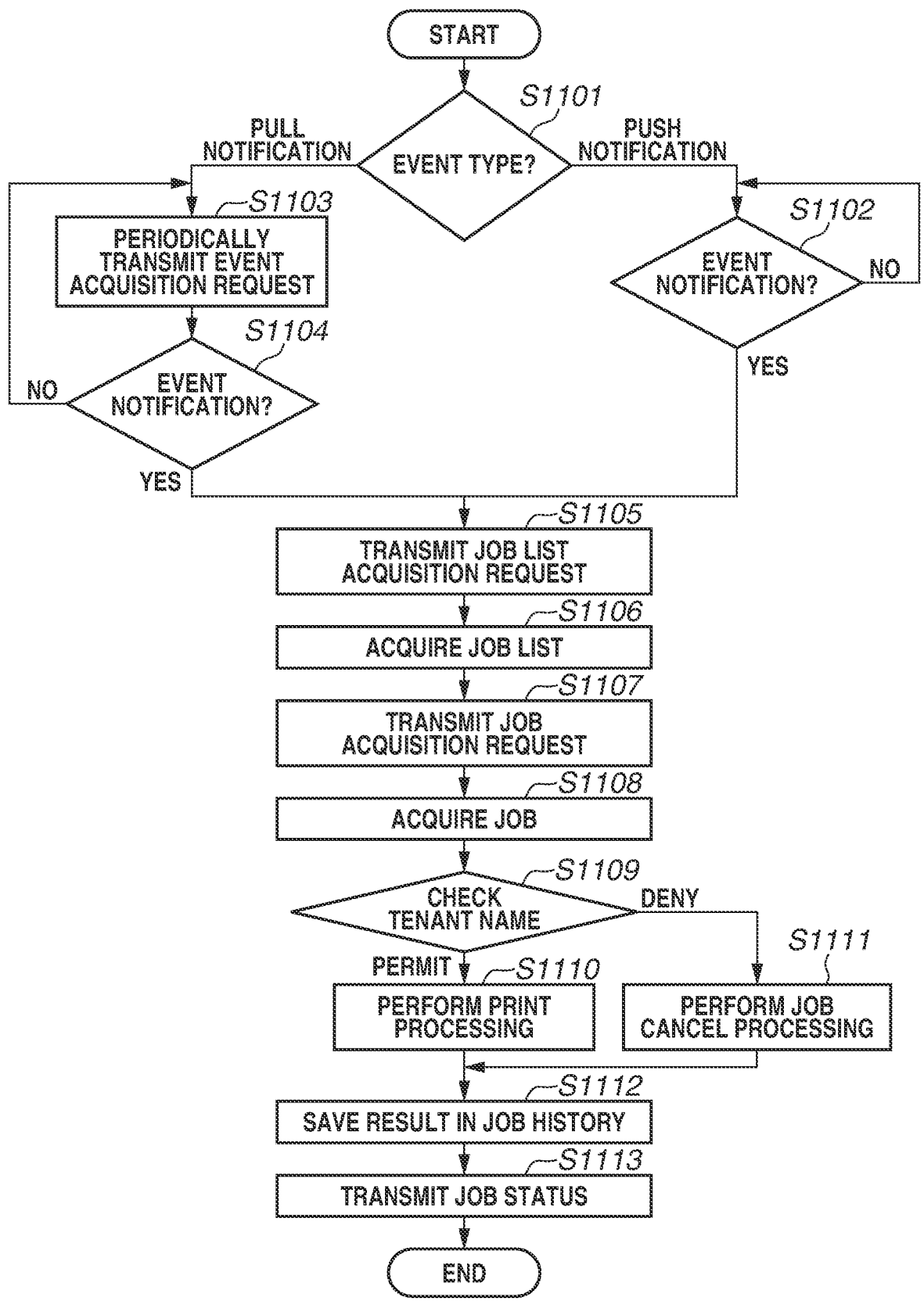
FIG. 11 is a flowchart illustrating cloud print according to one or more aspects of the present disclosure.

FIG. 10 is a sequence diagram illustrating a sequence for performing cloud print processing in a printing apparatus in which a printing permission setting has been made. FIG. 11 is a flowchart illustrating the cloud print processing of the printing apparatus 101. Steps S1001 to S1011 are equivalent to steps S701 to S711. The printing apparatus 101 that has received print job data in step S1011 performs determination processing of a tenant name in step S1012. Specifically, the printing apparatus 101 refers to a "Requesting-user-uri" field included in the print job data, checks a tenant account name of a user who has input the print job, and compares the tenant account name with the printing permission setting of the printing apparatus 101.

If the print job includes the packet data 804 illustrated in FIG. 8, "smith@tenant104.oncompany.com" is stored in this field. In other words, the tenant is "tenant104.oncompany.com". On the other hand, the own tenant to which the printing apparatus 101 belongs is "tenant102.oncompany.com". If "grant a print permission only to an own tenant" is set in the printing apparatus 101, the tenants do not match. Thus, the printing apparatus 101 cancels this print job and does not execute print processing, and printing becomes inexecutable.

If "grant a print permission to all tenants" is set, a job is received from all tenants. Thus, the printing apparatus 101 performs print processing of the print job. If "tenant104.oncompany.com" is set with "grant a print permission to a specific tenant" being set, the printing apparatus 101 performs print processing of the print job. If "tenant104.oncompany.com" is not set, the printing apparatus 101 cancels this print job and does not execute print processing.

If the print job is canceled, the printing apparatus 101 displays information notifying the user of the cancellation on a job history screen as illustrated in FIG. 12. Furthermore, a message indicating that printing has been canceled due to the access right of the tenant may be displayed on this screen. The cancellation of a print job and processing related to the cancellation are collectively referred to as cancel processing, and various types of processing can be considered as the cancel processing as described above.

In this manner, providing such settings enables a printing apparatus to appropriately perform access control of a print job from users of other tenants even if a resource sharing setting is performed on a tenant side. In the present exemplary embodiment, a tenant name is checked by referring to the "Requesting-user-uri" field, but the attribute is not limited thereto as long as the attribute includes information for identifying a tenant, such as a tenant name, and a tenant name may be determined based on another attribute.

FIG. 11 is a flowchart illustrating cloud print processing which is performed by the CPU 201 of the printing apparatus 101 according to the present exemplary embodiment. In step S1101, the CPU 201 determines whether event notification of the printing apparatus 101 is set to PUSH notification or PULL notification. If event notification is set to PUSH notification ("PUSH NOTIFICATION" in step S1101), the processing proceeds to step S1102. In step S1102, the CPU 201 enters a standby state until an event notification is received from a tenant.

If event notification is set to PULL notification ("PULL NOTIFICATION" in step S1101), the processing proceeds to step S1103. In step S1103, the CPU 201 periodically transmits an event acquisition request to the tenant. In step S1104, the CPU 201 checks a response from the tenant and determines whether an event has occurred. If an event has occurred (YES in step S1104), the processing proceeds to step S1105. In step S1105, the CPU 201 transmits a job list acquisition request as illustrated in the packet data 801 in FIG. 8, to the tenant 102. In step S1106, the CPU 201 receives a job list acquisition request response as illustrated in the packet data 802 in FIG. 8, and acquires a job list result.

Next, in step S1107, the CPU 201 selects a specific one job from the job list, and transmits a job acquisition request as illustrated in the packet data 803 in FIG. 8, to the tenant 102. As a method for selecting a specific job, one job may be selected from the job list result at random and the processing may be repeated until all jobs are completed, or the user may select an optional one job. In step S1108, the CPU 201 acquires, from the tenant 102, print job data as illustrated in the packet data 804 in FIG. 8, and job information and user information associated with the print job data. In step S1109, the CPU 201 then performs the above-described tenant check, and determines whether the corresponding job is permitted to be printed.

If the CPU 201 determines that printing is permitted ("PERMIT" in step S1109), the processing proceeds to step S1110. In step S1110, print processing is executed. On the other hand, if the CPU 201 determines that printing is denied, ("DENY" in step S1109), the processing proceeds to step S1111. In step S1111, cancellation processing for the print job is executed. In step S1112, a normal end result is saved in a job history if the printing is permitted, or a print job failure result is saved in the job history if the printing is denied as illustrated in FIG. 12. A display method is not limited to the method illustrated in FIG. 12, and a reason for an error of a tenant access right may be displayed in more detail.

Lastly, the CPU 201 notifies a processing result to the tenant 102 in step S1113. For example, the CPU 201 notifies "Abort" or "Cancel" as a job status if job cancellation processing is executed, and notifies "Completed" or "Printed" if normal processing is performed.

As described above, according to the first exemplary embodiment, a tenant to which a printing apparatus belongs can execute appropriate printing access control by controlling printing of a print job from a user of another tenant.

A second exemplary embodiment of the present disclosure will be described below. In the first exemplary embodiment, the description has been provided of an example case where, if a print job is input to a tenant, a printing apparatus immediately detects the print job and performs printing. In such a case, there is no guarantee that a user who has input the print job is always in front of the printing apparatus at the moment of sheet discharge. Thus, there is such a risk that a third party who is in front of the printing apparatus at the moment of sheet discharge takes away a document discharged by the printing apparatus. In the present exemplary embodiment, the description will be provided of an example case where a print job of a tenant is acquired and a sheet is discharged after a user logs into a printing apparatus. The description of parts already described in the first exemplary embodiment will be omitted in principle.

<Cloud Print Processing in Login State>

Figure 13:
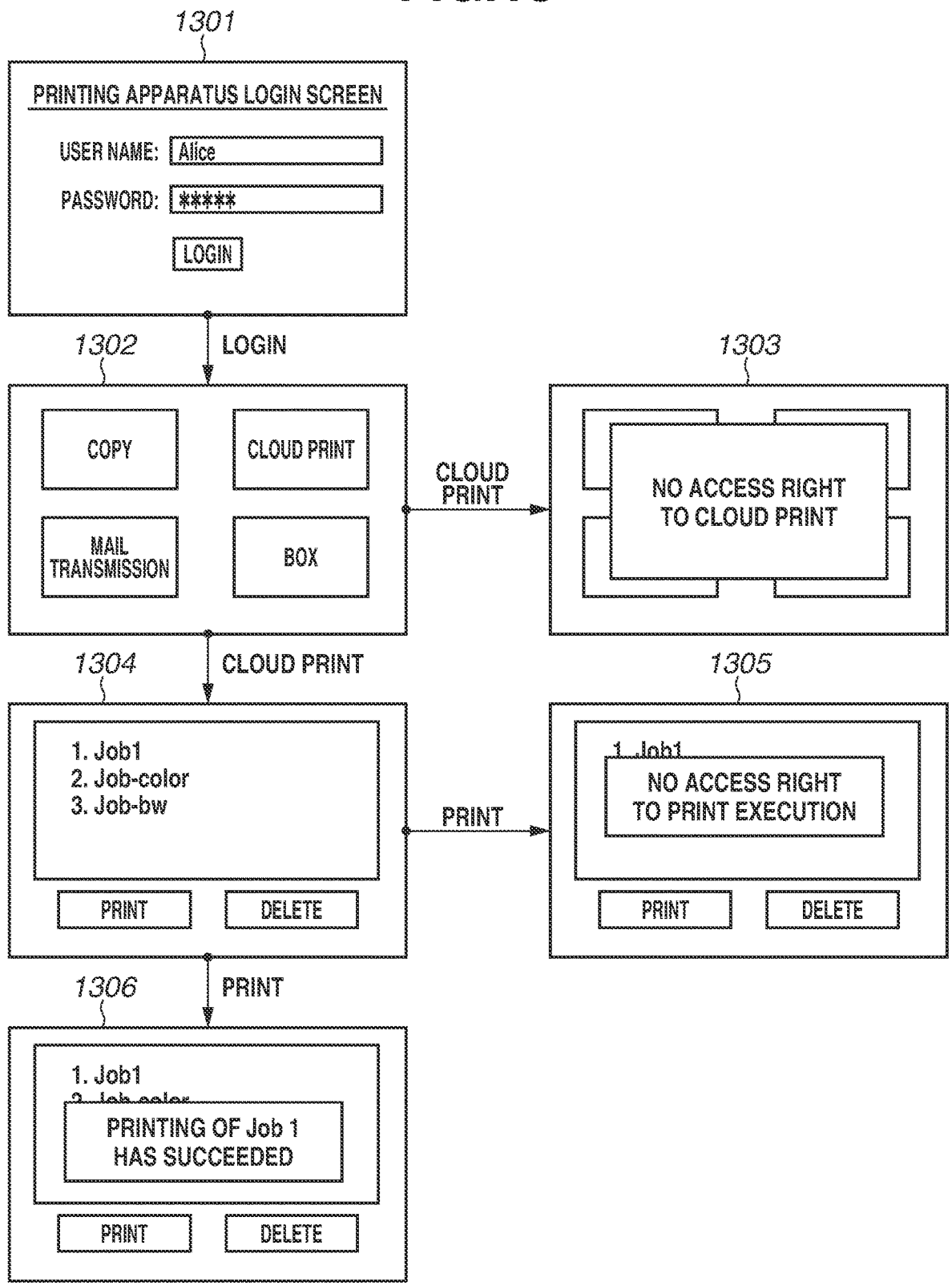
FIG. 13 is a diagram illustrating cloud setting screens of a printing apparatus according to one or more aspects of the present disclosure.
Figure 14:
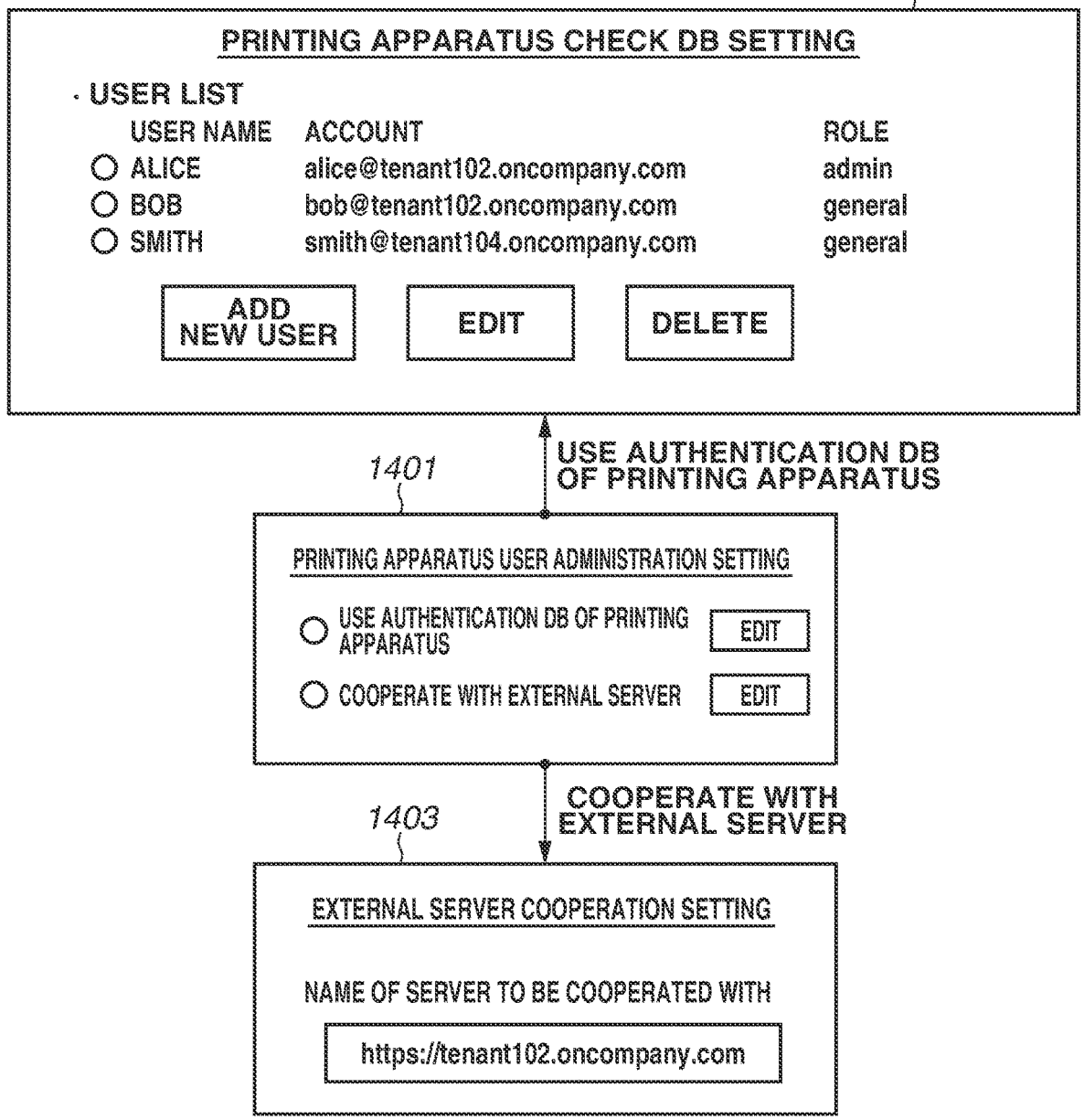
FIG. 14 is a diagram illustrating an authentication setting screen of the printing apparatus according to one or more aspects of the present disclosure.

FIGS. 13 and 14 illustrate operation screen examples of the printing apparatus 101 according to the present exemplary embodiment. FIG. 13 illustrates a screen example provided by a local UI, and FIG. 14 illustrates a screen example provided by a local UI and a remote UI. If the user desires printing to be performed when the user is in front of the printing apparatus 101, after the user inputs a job to the tenant, first of all, the user logs into the printing apparatus 101 via a screen 1301. The screen illustrates an example in which the user logs into the printing apparatus 101 by inputting a user name and a password of themselves, but the user may log into the printing apparatus 101 by using an IC card or biometric authentication.

The printing apparatus 101 determines whether the user can log into the printing apparatus, in conformity to a preset printing apparatus user administration setting illustrated in FIG. 14. As illustrated in a screen 1401 in FIG. 14, a user administration setting can be selected from "use an authentication database (DB) of the printing apparatus" and "cooperate with an external server". If "use an authentication DB of the printing apparatus" is selected, a printing apparatus administrator registers user information in the printing apparatus 101 as illustrated in a screen 1402 in FIG. 14.

Each user preregisters a user name and a password of themselves in the printing apparatus 101, and inputs corresponding information when logging into the printing apparatus 101. If "cooperate with an external server" is selected, as illustrated in a screen 1403 in FIG. 14, a URL, a host name, or an Internet Protocol (IP) address of an external server to be cooperated with becomes settable. User information input to the printing apparatus 101 is transferred to the external server without change, and the external server determines whether the user is allowed to log into the printing apparatus 101, and transmits a response to the printing apparatus 101.

If the user has succeeded in logging into the printing apparatus 101, as illustrated in a screen 1302 in FIG. 13, a top screen of the local UI is displayed, and icons such as a "copy" icon, an "e-mail transmission" icon, and a "cloud print" icon become selectable, and the user selects a desired icon. If the "cloud print" icon for performing printing by communicating with a print service and receiving a print job is selected, the screen transitions to a screen 1304 in FIG. 13, and a print job list of the user is displayed. In this example, three jobs exist and job names of the respective jobs are displayed. If the user selects an optional one job and selects a "print" button, the printing apparatus performs print processing, and as illustrated in a screen 1306 in FIG. 13, the screen shifts to the display of printing completion at the time point at which sheet discharge has been completed.

Figure 15:
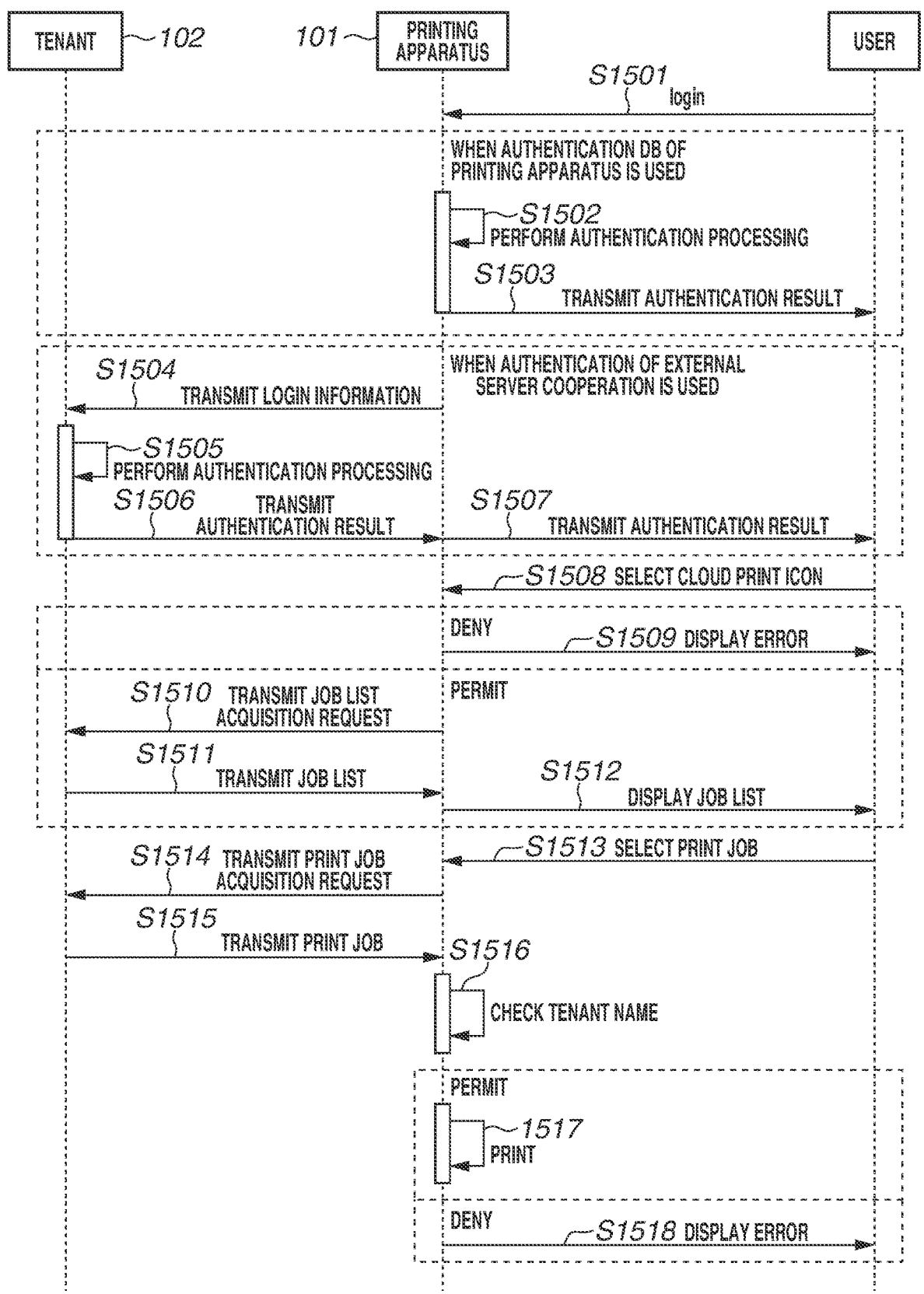
FIG. 15 is a sequence diagram illustrating cloud print according to one or more aspects of the present disclosure.

FIG. 15 illustrates a processing sequence of the above-described operation screens. First of all, in step S1501, the user attempts to log into the printing apparatus 101. If "use an authentication DB of the printing apparatus" is set, in step S1502, the CPU 201 of the printing apparatus 101 determines whether the user is allowed to log into the printing apparatus 101, by checking login information against user information saved in the printing apparatus 101. In step S1503, the printing apparatus 101 displays a login screen if the login has succeeded or displays a login failure if the login has failed. If "cooperate with an external server" is set, in step S1504, the printing apparatus 101 transfers login information to the external server. In step S1505, the external server determines whether the user is allowed to log into the printing apparatus 101 by checking the transferred login information against the user information saved in the external server. As a result, in step S1506, information indicating success or failure is notified from the external server to the printing apparatus 101, and in step S1507, the printing apparatus 101 displays a login screen if the login has succeeded or displays a login failure if the login has failed.

After the login has succeeded, in step S1508, the user selects the "cloud print" icon.

If the icon is selected, in step S1510, the printing apparatus 101 transmits a job list acquisition request including packet data 1601 as illustrated in FIG. 16, to the tenant 102. In the request, a "My-jobs" attribute is set to "True", and a tenant account name of the login user is stored into a "Requesting-user-uri" attribute as information for identifying the user.

In step S1511, the tenant 102 that has received the request transmits a job list of user information matching the tenant account name in the "Requesting-user-uri" attribute, as an acquisition request response including packet data 1602 as illustrated in FIG. 16. The response packet indicates that two jobs exist as jobs of Smith as can be seen from "job-id". In step S1512, the printing apparatus then displays the acquired job list on the local UI.

In step S1513, the user selects an optional one job desired to be printed, from the job list, and selects a print button. If the job is selected, in step S1514, the printing apparatus 101 transmits a print job acquisition request including packet data 1603 as illustrated in FIG. 16, to the tenant 102. In step S1515, the tenant 102 that has received the acquisition request transmits a response as illustrated in packet data 1604 in FIG. 16 that includes a corresponding print job, to the printing apparatus 101. In step S1516, the printing apparatus 101 checks the tenant name. After all pieces of print job data have been acquired, in step S1517, the printing apparatus 101 performs print processing and discharges sheets. By performing this processing, the discharge processing is not performed unless the user logs into the printing apparatus 101 in front of the printing apparatus. This reduces the risk of leakage of information on a printed document to the third party, and enhances security.

Figure 17:
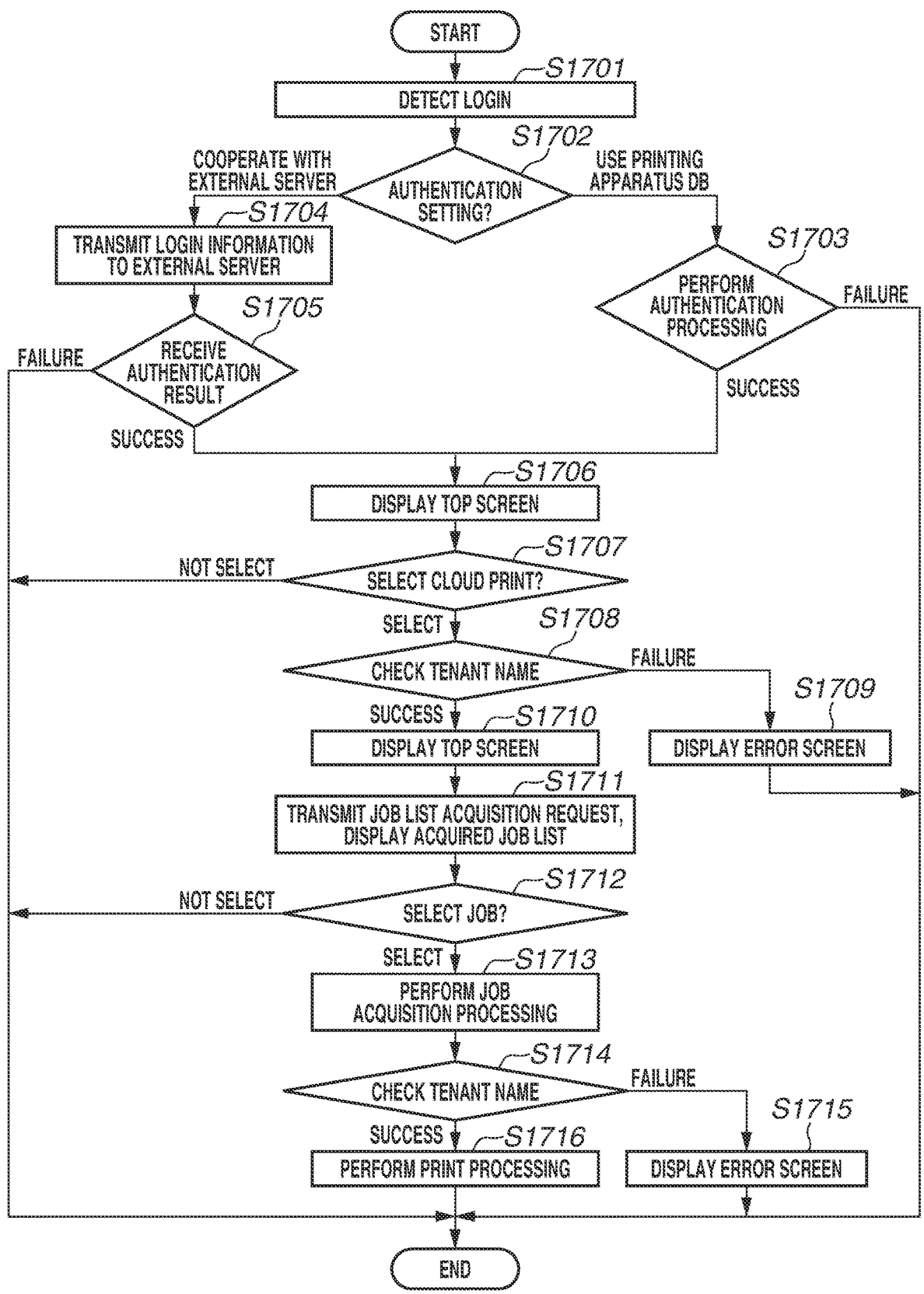
FIG. 17 is a flowchart illustrating cloud print according to one or more aspects of the present disclosure.

FIG. 17 is a flowchart illustrating cloud print processing which is performed by the CPU 201 according to the present exemplary embodiment. First of all, in step S1701, the CPU 201 determines whether a login event has occurred. Next, in step S1702, the CPU 201 refers to an authentication setting set in the printing apparatus 101, and if "use an authentication DB of the printing apparatus" is set ("USE PRINTING APPARATUS DB" in step S1702), the processing proceeds to step S1703. In step S1703, the CPU 201 executes authentication processing. If "cooperate with an external server" is set ("COOPERATE WITH EXTERNAL SERVER" in step S1702), the processing proceeds to step S1704. In step S1704, the CPU 201 transfers login information to the external server. In step S1705, the CPU 201 receives an authentication result and determines whether the login has succeeded or failed.

If the login has succeeded ("SUCCESS" in step S1705), the processing proceeds to step S1706. In step S1706, the CPU 201 displays the top screen 1302 illustrated in FIG. 13. If the "cloud print" icon is selected ("SELECT" in step S1707), the processing proceeds to step S1711. In step S1711, the CPU 201 transmits a job list acquisition request to the tenant 102, and displays an acquired job list. If an optional job is selected by the user ("SELECT" in step S1712), the processing proceeds to step S1713. In step S1713, the CPU 201 transmits an acquisition request requesting for the job to the tenant 102 and acquires print job data. In step S1716, the CPU 201 performs the print processing on the acquired print data and discharges sheets. In the present exemplary embodiment, the "Requesting-user-uri" attribute is used for identifying the user, but another attribute may be used as long as the user can be uniquely identified.

<Access Control of Cloud Print Processing in Login State>

Printing performed by users of other tenants is desired to be restricted in some cases also in a case where the user logs into the printing apparatus 101 and acquires a job from a tenant as described above. A method for implementing such restriction will also be described. The operations for presetting the printing apparatus 101 is similar to the one described with reference to FIG. 9. The processing for such a case will be described using an example in which the printing apparatus 101 and Smith belong to different tenants, and Smith is unauthorized to access the printing apparatus 101.

If Smith logs into the printing apparatus 101 and selects the "cloud print" icon, the printing apparatus 101 determines whether the corresponding user is a refusal target user for cloud print, and if the corresponding user is a refusal target user, the printing apparatus displays an error screen 1303 in FIG. 13 indicating that "cloud print" is inexecutable. The determination may be made before the "cloud print" icon is selected. The refusal target user thereby becomes unable to execute printing. The determination as to whether the user is an access refusal target is performed by the following processing.

First of all, "Smith" is input as a user name input on the screen 1301 illustrated in FIG. 13. If the printing apparatus 101 refers to an internal authentication DB setting at this time, the printing apparatus 101 can see that a tenant account of the user name "Smith" is "smith@tenant104.oncompany.com". It can also be seen that the tenant registered by the printing apparatus 101 is "tenant102.oncompany.com". Thus, if the user is a user of a refusal target tenant set in FIG. 9, it can be seen that the user is to be denied, by comparing tenant names. Accordingly, an access failure is determined at the moment at which the "cloud print" icon is selected. If the determination is made in advance, it is only required that the icon is displayed in an unselectable manner.

The determination is made in step S1509 in the sequence diagram illustrated in FIG. 15. If the "cloud print" icon is selected in step S1508, tenant names are checked against each other, and if the user is determined to be a print refusal target, in step S1509, the error screen 1303 as illustrated in FIG. 13 is displayed.

The determination is made in step S1708 in the flowchart illustrated in FIG. 17. In step S1708, tenant names are checked against each other, and if the user is determined to be a printing refusal target ("FAILURE" in step S1708), the processing proceeds to step S1709. In step S1709, the error screen 1303 as illustrated in FIG. 13 is displayed. If the user is determined to be a printing permission target ("SUCCESS" in step S1708), the processing proceeds to step S1710. In step S1710, print processing is continued. By the access control, a user of a tenant set to be a refusal target cannot execute print processing. Thus, appropriate access control can be achieved.

<Access Control of External Server Cooperation>

If an authentication setting of the printing apparatus 101 is set to "cooperate with an external server", in some cases, check processing cannot be executed at a time point at which the "cloud print" icon is selected, as described above. This is because the printing apparatus 101 sometimes fails to acquire information to be checked, since the printing apparatus 101 does not refer to login information or the printing apparatus 101 cannot acquire a tenant account of a user saved in the external server in some cases, if the printing apparatus 101 cooperates with the external server.

In such a case, as in step S1516, tenant check processing is performed at a time point at which a print job is acquired, and whether the user is an access refusal target is determined. Specifically, when print job data is acquired in step S1516, the packet data 1604 as illustrated in FIG. 16 can be acquired. A value of the "Requesting-user-uri" attribute included in the packet data 1604 includes tenant account information about the user who has input the job. In this example, it can be seen that the tenant account information is "smith@tenant104.oncompany.com" and a tenant name is "tenant104.oncompany.com". The printing apparatus 101 can thus acquire tenant information about the corresponding job.

The printing apparatus 101 can acquire the name of the registered tenant of the printing apparatus 101 as illustrated in FIG. 6, and thus, tenant names can be compared. If the setting of refusing a job from another tenant is set, the user is notified that printing is inexecutable, by displaying an error screen 1305 as illustrated in FIG. 13.

This processing is executed in step S1714 in the flowchart illustrated in FIG. 17. The check of tenant names is performed in step S1714, and if the user is determined to be a printing refusal target ("FAILURE" in step S1714), the processing proceeds to step S1715. In step S1715, the error screen 1305 as illustrated in FIG. 13 is displayed. If the user is determined to be a printing permission target in step S1714 ("SUCCESS" in step S1714), the processing proceeds to step S1716. In step S1716, the print processing is continued.

With this configuration, even if the printing apparatus 101 cannot acquire login information by cooperating with the external server, a user of a tenant set to be a refusal target cannot execute print processing. Thus, appropriate access control can be executed. The first and second exemplary embodiments may be made switchable in accordance with the setting of the printing apparatus, or may be simultaneously enabled.

Heretofore, the present disclosure applicable to the configuration in which a user acquires a print job of a tenant and discharges sheets after the user logs into a printing apparatus has been described.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-023922, filed Feb. 13, 2019, which is hereby incorporated by reference herein in its entirety.

What is claimed is:

1. A printer that communicates with a print service that provides, in a case where a printer belonging to a first tenant is instructed to be shared by a user belonging to a second tenant, a print job to the printer belonging to the first tenant in accordance with a printing instruction of the user belonging to the second tenant, the printer comprising:
  a registration unit configured to start processing of registering the printer in the first tenant in accordance with a registration instruction from an owner belonging to the first tenant of the printer;
  a setting unit configured to receive, from the owner, a setting for determining a tenant that is allowed to use the printer registered in the first tenant,
  a holding unit configured to hold an authentication database in which a login account of a user who logs in to the printer is associated with a tenant account of the user; and
  a print control unit configured to, at timing when a user has logged in to the printer, identify a tenant account associated with a login account of the user who has logged in and to print the user's print data provided by the print service and including the identified tenant account,
  wherein the print data provided by the print service is printed if a tenant name corresponding to the tenant account included in the print data provided by the print service is the same as a tenant name of a tenant set by the setting unit, but the print data provided by the print service is not printed if a tenant name corresponding to the tenant account included in the print data provided by the print service is not the same as a tenant name of a tenant set by the setting unit.

2. The printer according to claim 1, wherein the setting is a setting of designating only the first tenant as the tenant that is allowed to use the printer registered in the first tenant.

3. The printer according to claim 1, wherein the setting is a setting of designating all tenants including the first tenant and the second tenant, as the tenant that is allowed to use the printer registered in the first tenant.

4. The printer according to claim 1, wherein the setting is a setting of designating a tenant specified by the owner, as the tenant that is allowed to use the printer registered in the first tenant.

5. The printer according to claim 1, further comprising a provision unit configured to provide a setting screen for receiving the setting,
  wherein the setting screen includes information indicating a registration state of the printer.

6. The printer according to claim 1, wherein the print job of a user is processed in a case where the print job is received and a tenant to which the user that has submitted the print job belongs and which is identified by information being referred is included in a tenant determined to be allowed to use the printer, the information being included in the print job and being used for identifying a tenant.

7. The printer according to claim 1, wherein cancel processing is performed without processing the print job of a user in a case where the print job is received and a tenant to which the user that submitted the print job belongs and which is identified by information being referred is not included in a tenant determined to be allowed to use the printer, the information being included in the print job and being used for identifying a tenant, and the cancel processing includes notifying the first tenant in which the printer is registered that the print job has been cancelled, and displaying that the print job has not been processed due to an error of a tenant access right, on a screen for displaying a job history of the printer.

8. The printer according to claim 1, wherein, during a period from when a user logs into the printer to when an icon for printing that uses the print service is selected, whether to process a print job of the user is determined based on a tenant to which the user who has logged into the printer belongs and a tenant to which the printer belongs, and an error is displayed in a case where the print job is not processed.

9. A method for controlling a printer that communicates with a print service that provides, in a case where a printer belonging to a first tenant is instructed to be shared by a user belonging to a second tenant, a print job to the printer belonging to the first tenant in accordance with a printing instruction of the user belonging to the second tenant, the control method comprising:
   starting processing of registering the printer in the first tenant in accordance with a registration instruction from an owner belonging to the first tenant of the printer; and
   receiving, from the owner, a setting for determining a tenant that is allowed to use the printer registered in the first tenant,
   holding an authentication database in which a login account of a user who logs in to the printer is associated with a tenant account of the user; and
   controlling, at timing when a user has logged in to the printer, identify a tenant account associated with a login account of the user who has logged in and to print the user's print data provided by the print service and including the identified tenant account,
   wherein the print data provided by the print service is printed if a tenant name corresponding to the tenant account included in the print data provided by the print service is the same as a tenant name of a tenant set, but the print data provided by the print service is not printed if a tenant name corresponding to the tenant account included in the print data provided by the print service is not the same as a tenant name of a tenant set.

10. A non-transitory computer-readable storage medium storing a program for causing a printer to perform a process, the printer that communicates with a print service that provides, in a case where a printer belonging to a first tenant is instructed to be shared by a user belonging to a second tenant, a print job to the printer belonging to the first tenant in accordance with a printing instruction of the user belonging to the second tenant, the process comprising:
   starting processing of registering the printer in the first tenant in accordance with a registration instruction from an owner belonging to the first tenant of the printer; and
   receiving, from the owner, a setting for determining a tenant that is allowed to use the printer registered in the first tenant,
   holding an authentication database in which a login account of a user who logs in to the printer is associated with a tenant account of the user; and
   controlling, at timing when a user has logged in to the printer, identify a tenant account associated with a login account of the user who has logged in and to print the user's print data provided by the print service and including the identified tenant account,
   wherein the print data provided by the print service is printed if a tenant name corresponding to the tenant account included in the print data provided by the print service is the same as a tenant name of a tenant set, but the print data provided by the print service is not printed if a tenant name corresponding to the tenant account included in the print data provided by the print service is not the same as a tenant name of a tenant set.

\* \* \* \* \*